March 24, 1959

R. A. EDWARDS 2,879,079

TRAILER COUPLING

Filed June 29, 1956

INVENTOR.
Ralph A. Edwards
BY
ATTORNEY

United States Patent Office 2,879,079
Patented Mar. 24, 1959

2,879,079

TRAILER COUPLING

Ralph A. Edwards, Plainview, Minn.

Application June 29, 1956, Serial No. 594,851

1 Claim. (Cl. 280—446)

My present invention relates broadly to a novel and improved trailer coupling and more specifically to a means connecting a trailed vehicle to a tractive unit.

The principal object of my invention is to provide a coupling between trailed vehicles and tractive units that will permit free swinging movement between the draft connection and the drawbar of a trailer under normal operating procedures and which will remain rigid for normal traction purposes but which will automatically be rendered flexible when the said free swinging movement exceeds right or left hand safety limits which are predetermined.

Another object of my invention is to provide a trailer coupling that can, in addition to being capable of being rendered flexible, be locked in a rigid normal operating position when a trailed vehicle is being drawn by a tractive unit on a highway or public road.

A still further object of this invention is to provide a trailer coupling wherein its safety factor, i.e., the automatic shift from rigid to flexible connection, is predetermined and set according to work, terrain and cooperating equipment.

A further object of the invention is to provide a coupling wherein a positive stop is provided to limit lateral swinging movement of the same when the coupling is in a flexible position.

A still further object of the invention is to provide a trailer coupling that is adaptable, and capable of being installed on equipment already in use as well as being standard, and factory installed on new equipment.

It is well known that when in trailing a conventional field wagon behind a modern tractor, that manifold problems are prone to develop especially when making sharp right angle turns such as the average modern tractor is capable of making and under which circumstances twisted, bent, and broken drawbars are common occurrences together with tipped wagons and the loss and attendant danger connected therewith.

By the use of my novel trailer coupling these problems have been met in a manner that is simple and economical to install on both old and new equipment and which in every respect meets highway department and underwriters regulations.

These and other objects of the invention will be apparent from the following specification and claims taken in conjunction with the appended drawings which form a part of this invention wherein the coupling alone is shown. Inasmuch as it will be understood that the coupling becomes an integral part of the drawbar of a vehicle, in the interest of avoiding superfluous drawings, the trailed vehicle has not been shown in any of the following views.

While it is obvious that the device will function with the draft factor applied to either end thereof, it has been found that most satisfactory operation is obtained when the device is assembled for use as shown by directional arrows.

In the accompanying drawings which illustrate the invention, like characters indicate like parts throughout the several views.

Figure 1:
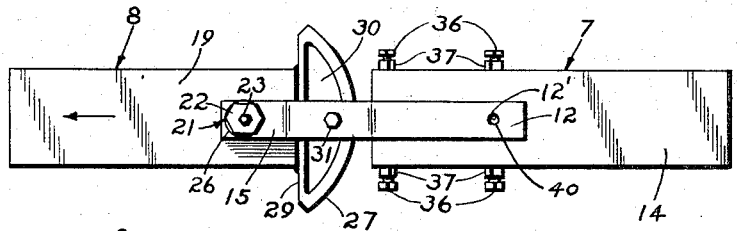
Fig. 1 is a top plan view of the novel coupling in a rigid position with a directional arrow showing the direction of pull.
Figure 2:
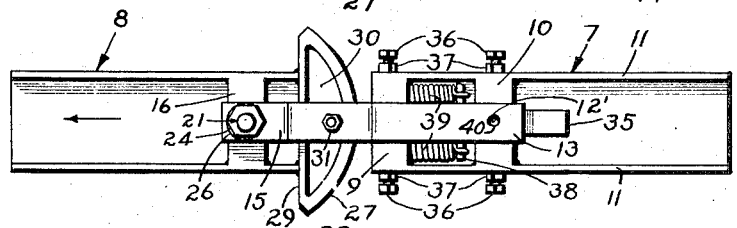
Fig. 2 is a bottom plan view also of the same.
Figure 3:
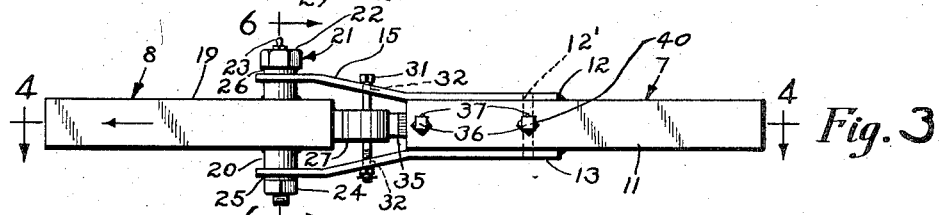
Fig. 3 is a side elevational view also of the same.
Figure 4:
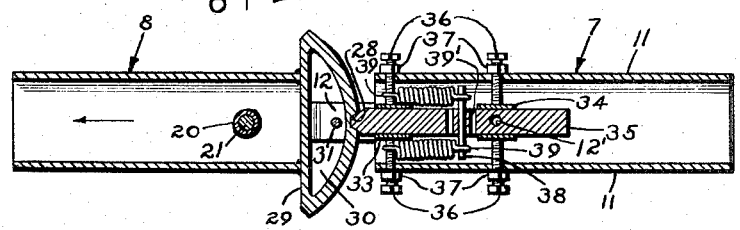
Fig. 4 is a longitudinal sectional view of the device with its operating parts in normal rigid position taken on the line 4—4 of Fig. 3.
Figure 5:
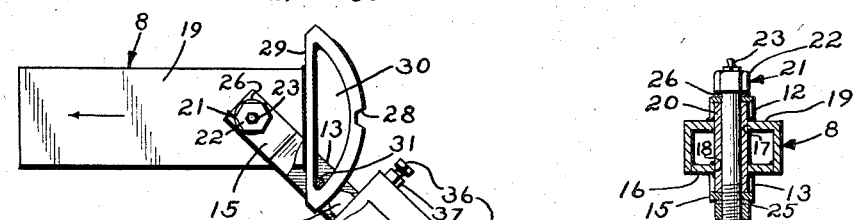
Fig. 5 is a top plan view of the device in flexible position certain portions thereof being broken away to more clearly show the underlying parts, and, Fig. 6 is a transverse section of the coupling taken on the line 6—6 Fig. 3.
Figure 6:
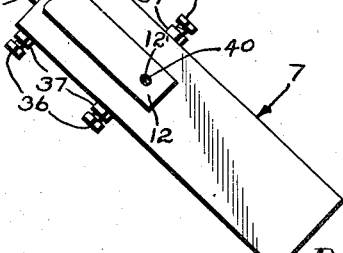

The numeral 7 indicates the inner end section of the coupling member and the numeral 8 indicates the outer end portion which in other words are the trailer and draft ends thereof respectively. These sections 7 and 8 as shown form an integral part of the tongue of a trailer type vehicle and are in the form of an inverted channel that is rectangular in transverse section. A pair of longitudinally spaced cross-tie members 9 and 10 are connected by welding, at the outer end portion of the section 7, to the downturned flanges 11 of the said section 7, at their lower edge portions. A pair of longitudinally extended bars or arms 12 and 13 are attached by welding to the section 7, the former to the upper flat surface 14 of the section 7 and the latter to the cross-tie members 9 and 10 respectively. Outwardly of the outer end portion of the section 7 these bars or arms 12 and 13 are disposed in upwardly and downwardly diverging relation and thence terminate at their outer end portions in a vertically spaced horizontal plane relative to the plane of the section member 7 to form a yoke or clevis 15.

The cooperating section 8 is constructed in an identical manner as section 7 except that it is provided with a single cross-tie member 16. A pair of aligned holes 17 and 18 respectively in the upper flat surface 19 of the inner end portion of the section 8 and the cross-tie member 16 provide a mount for a tubular bearing or sleeve 20 that extends transversely in a vertical plane through said aligned holes 17 and 18 and is rigidly attached to the members 17 and 19 of section 8 by welding. The upper and lower end portions extend above and below the upper flat surface 19 and the cross-tie member 16 to receive the upper and lower members 12 and 13 and a nut-equipped hexagon bolt 21 extends through aligned holes 17 and 18 and the tubular bearing sleeve 20, thus pivotally connecting the sections 7 and 8. The hexagon bolt 21 and the fitting 23 which is in communication with a longitudinal bore extending axially through the body portion of the bolt 21, which bore is also in communication with a plurality of transverse bores in said bolt for providing lubrication to this pivotal connection, are all conventional. A hexagon nut 24 and a lock washer 25 draw the outer end portions of the yoke or clevis 15 into relatively tight pivotal relation with the bearing sleeve 20 for free lateral swinging movement. A spacer washer 26 is interposed between the lower surface of the head 22 of the hexagon bolt 21 and the upper surface of the member 12 of the yoke or clevis 15 to facilitate free swinging movement and prevent wear of the member 12.

Rigidly attached by welding to the inner end portion of the section 8 in a horizontal plane, is a relatively wide radial link bar 27 which is provided at its circumferential center with a relatively wide deep notch 28, the purpose of which will be presently explained.

It may be well to explain at this point that the link bar 27 is constructed like a segment of an open circle wherein the ends of the radial portion are joined by a connecting link 29 thus affording an open section 30 which permits free lateral swinging movement in said open section of a stop pin 31 in the form of a nut-equipped bolt that extends through aligned holes 32 in the members 12 and 13 of this yoke or clevis 15. Obviously this stop pin 31 will limit lateral swinging movements of the pivotally connected sections 7 and 8 when the stop pin 31 engages the inner juncture of the link 29 and the radial bar 27.

Rigidly attached to the under surface of the inner section 7, by welding, and longitudinally spaced apart, are a pair of substantially square guide sleeves 33 and 34 respectively within which guide sleeves a heavy lock bar 35 is mounted with a close working fit, the outer end portion of which is tapered and machined for close engagement with the notch 28 in the radial link bar 27 of the section 8. This lock bar is in exact axial alignment with said notch when the assembly is in normal rigid operating position. Pairs of opposed screw-threaded bolts 36 equipped with lock nuts 37 having screw-threaded engagement with the downturned flanges 11 of the section 7 are screwed inwardly until they abut the side portions of the guide sleeves 33 and 34 thus further strengthening the rigidity of said sleeves 33 and 34 against any lateral strain.

For normal rigid operation the lock bar 35 is projected into engagement with the notch 28 and held in such engagement by a pair of coiled springs 39 under strain. These springs 39 have as their base of resistance the inwardly projecting opposed bolts 36, reference being had to the outer opposed pair thereof, and attached at their inner end portions to a pin 38 that extends through a transverse bore 39' in the lock bar 35, and outwardly of the sides thereof to afford means for anchoring the said inner end portions of the springs 39, thus outwardly projecting the lock bar 35 under strain into engagement with the notch 28.

It will be understood that the tension of this engagement of the notch and the lock bar will be dictated by experiment and a plurality of longitudinally spaced bores like 39, may be provided to vary the spring tension. Obviously, the engaging faces of the notch and the lock bar may also be varied by experiment to determine the thrust factor wherein the device will operate to shift from rigid to flexible operation.

To insure positive locked arrangement of the entire assembly as may be dictated by operation procedures and highway department regulations, there is provided a lock pin 40 in the form of a headed bolt that extends completely through aligned holes 12' in the upper bar 12, the upper flat surface of the section 7, the lock bar 35 and the inner crosstie member 10 of the section 7, when the said lock bar 35 is projected into the notch 28 thus rigidly connecting the sections 7 and 8 and rendering the flexible components inoperable.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claim as are stated herein, or required by the prior art.

What I claim is:

A coupling of the class described, comprising a draft section and a trailer section, one of said sections having a yoke formed thereon pivotally connected to the other of said sections and forming an integral draft connection for a trailer type vehicle, one of said sections having aligning means, a spring loaded lock bar slidably mounted in the other of said sections for endwise longitudinal movements cooperating with said aligning means in the former section wherein the spring loaded lock bar is normally projected under predetermined tension into engagement with the said aligning means thus maintaining axial alignment of the said sections under normal load and operating conditions, and said aligning means rendered inoperable by excessive lateral force imposed upon the pivotally connected sections whereby the said lock bar is forced out of its spring loaded engagement with the said aligning means to relieve lateral stresses imposed upon the draft connection, a pair of bearing sleeves rigidly attached to the trailer section for mounting the lock bar for endwise longitudinal movement, and secondary means in the form of front and rear pairs of opposed bolts and lock-nuts, the former having screw-threaded engagement with the main body portion of the trailer section which, when turned inwardly, impinge the sides of said bearing sleeves to further overcome the factor of lateral strain.

References Cited in the file of this patent
UNITED STATES PATENTS

| | | |
|---|---|---|
| 1,574,072 | Endelrock | Feb. 23, 1926 |
| 1,604,697 | Kegiesse | Oct. 26, 1926 |
| 1,877,579 | Paul | Sept. 13, 1932 |
| 2,124,043 | Smith | July 19, 1938 |
| 2,474,986 | Rivers | July 5, 1949 |

FOREIGN PATENTS

| | | |
|---|---|---|
| 487,708 | France | July 23, 1918 |